(12) United States Patent
Richley et al.

(10) Patent No.: US 6,542,083 B1
(45) Date of Patent: Apr. 1, 2003

(54) ELECTRONIC TAG POSITION DETECTION USING RADIO BROADCAST

(75) Inventors: Edward A. Richley, Gaithersburg, MD (US); Roy Want, Los Altos, CA (US); Kenneth P. Fishkin, Redwood City, CA (US); Beverly L. Harrison, Palo Alto, CA (US); Anuj Uday Gujar, Mountain View, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/448,382

(22) Filed: Nov. 23, 1999

(51) Int. Cl.[7] .................................................. G08B 5/22
(52) U.S. Cl. ............................. 340/825.49; 340/825.57; 340/825.69; 340/825.72; 340/572.1; 340/674
(58) Field of Search ............................... 340/10.3, 10.1, 340/10.4, 825.57, 674, 572.1, 825.49, 825.69, 825.72; 342/42, 54, 47

(56) References Cited

U.S. PATENT DOCUMENTS

| 3,591,292 A | | 7/1971 | Feuchter et al. ............ 356/141 |
| 4,595,915 A | * | 6/1986 | Close ...................... 340/572.1 |
| 4,746,830 A | | 5/1988 | Holland ...................... 310/313 |
| 4,940,925 A | * | 7/1990 | Wand et al. ................. 318/587 |
| 5,134,277 A | | 7/1992 | Yerbury et al. ............. 250/214 |
| 5,594,228 A | | 1/1997 | Swartz et al. ............... 235/383 |
| 5,793,630 A | * | 8/1998 | Theimer et al. .............. 700/11 |
| 5,814,799 A | | 9/1998 | Swartz et al. ............... 235/383 |
| 5,825,045 A | | 10/1998 | Koenck et al. ............. 250/566 |
| 5,979,758 A | | 11/1999 | Swartz et al. ............... 235/383 |
| 5,995,046 A | * | 11/1999 | Belcher et al. ............. 342/450 |
| 6,008,727 A | | 12/1999 | Want et al. ................. 340/572 |
| 6,056,199 A | | 5/2000 | Wiklof et al. ............... 235/462 |
| 6,060,992 A | * | 5/2000 | Huang et al. ............ 340/572.1 |
| 6,078,258 A | | 6/2000 | Auerbach et al. ........... 340/568 |

FOREIGN PATENT DOCUMENTS

JP          216575      *   8/2001

* cited by examiner

*Primary Examiner*—Julie Lieu
(74) *Attorney, Agent, or Firm*—Robert A. Bartzlaff; Joseph M. Young

(57) ABSTRACT

A system for identification and tracking of tags distributed in a room, wherein the system includes an electromagnetic pulse generator to produce a local electromagnetic spike, a tag reactive to the local electromagnetic spike to provide a data signal, a data receiver for receiving the data signal, and a tag tracking system receiving input from the electromagnetic pulse generator and the data receiver, the tag tracking system storing state records of position and informational content of the tag.

8 Claims, 7 Drawing Sheets

ELECTRONIC TAG POSITION DETECTION USING RADIO BROADCAST

FIELD OF THE INVENTION

The present invention relates to low power electronic tags and tag tracking systems. More particularly, the present invention relates to radiofrequency tags externally triggered by a directed light or electromagnetic pulse.

BACKGROUND AND SUMMARY OF THE INVENTION

Tagging objects to aid in identification, security, and organization is widely employed by businesses. Passive tag systems include conventional bar code tags, microwave detectable tags, or tags marked with computer readable alphanumerics. However, all of these tagging solutions generally require close proximity between the tag and the tag reader, typically less than a meter. For applications where tags need to be identified in a 1 to 5 meter range, active tags that have onboard power to broadcast radio or infrared pulses can be used. For example, a battery powered infrared tag utilizing IrDA pulse modulation can be constructed to emit an identification pulse sequence every 10 to 15 seconds, and can have a lifetime on the order of a year. However, since such active devices are costly, generally have a high power cost, and can require expensive battery or photovoltaic power systems, they are unsuitable for applications requiring hundreds or even thousands of tags.

Conventional passive (e.g. optically readable bar codes) or active (e.g. infrared emissive) tags can also be difficult to find or determine exact position in a room sized area. Imaging detectors such as camera systems are costly, and can require substantial computing power to extract data signals from a tag and determine three-dimensional position of the tag. What is needed is a tagging system that can be easily read from a distance with augmented portable computing devices such as handheld or palm-sized computers, or automatically determined (without user assistance) using a non-imaging room scanning system. Such tagging systems can support local communication between nearby computers, or more generally can support wireless network or internetwork communications relating to data signals from the tags. Users equipped with suitable portable computers can, for example, receive identifying information from local tags, and be connected to an updateable networked database that stores position state, identifying information concerning the tagged object, and a record of previous state changes for the tag. As will be appreciated, flexibility and utility of various applications can be enhanced if the precise spatial location of the tagged objects known. Knowing the location of the tag (with a precision of several meters or so) permits construction of user specific maps, transfer of location information to others, and receipt of location information for nearby computational or real world resources. For this reason, having easily determinable and reliable position information is a useful feature.

Improved information dissemination and organization for individuals or organizations is enhanced with a stable and reliable mechanism for tracking and locating multiple tagged objects in conventional room or office sized areas. Tagged objects can be assembled, manipulated, and maintained to create, alter, preserve, share, or coordinate information. For example, wall mounted pin boards or magnetic boards can be used by an individual or group to transiently or semi-permanently display documents, calendars, task schedules, phone number lists, project proposals, informational flyers, meeting announcements, photographs, maps, or any other desired information. In some cases, small physical artifacts such as keys or magnetic icons can even be attached to the surface.

Accordingly, in preferred embodiments the present invention includes a laser locating and tracking system for externally activated electronic tags. Such a non-imaging system can precisely locate and identifying tagged objects in a confined space such as a room or office. The system includes at least one laser base station for scanning laser beams, and supports identification and spatial positioning of multiple tags reactive to incident laser beams to provide a data signal. A tag tracking system receives input from the laser base station, with the tag tracking system storing state records of position and informational content of the tag. Position can be optionally determined by angular position of the tag with respect to one or more the laser base stations. The tags are passive (with no internal power), or active, having an internal power supply to power a data broadcast element.

An externally light activated, low power active electronic tag is particular useful in conjunction with the present invention. Such low power electronic tags and tag tracking systems can use infrared or radiofrequency tags having identification circuits externally triggered by a directed light pulse. Such tags generally have an internal power supply (e.g. battery), a data broadcast element controlled by a microcontroller and powered by the internal power supply, and a laser beam trigger circuit activated by an incident laser beam to trigger data broadcast by the data broadcast element. The data broadcast can be optical, infrared, radio, or even acoustic signals. A preferred data broadcast standard is based on the connectionless IrDA protocol pulse modulated infrared data signals. Such signals can be detected by conventional infrared transceivers commonly deployed with portable, laptop, or palmtop computers. The tags can be readily activated by a low power laser attached to a palmtop computer, for example, allowing a user to specify tag activation from a distance. Alternatively, automatic laser scanning systems can be used to continuously and automatically track tag positions.

For some applications the foregoing externally activated tags are not ideal, since they still require a battery, have a relatively large form factor, and can be somewhat expensive. For applications requiring very large numbers of identification tags, a bar code-like system readable from a distance (1 to 5 meters) is preferred. Accordingly, another preferred embodiment of the present invention provides for patterned retroreflective tags usable in laser scanning systems. Typically, such patterned retroreflective tags are multilayered, and the tags can have fixed or dynamically changeable laser readable regions. Typically, a tag identification system would include a tag having retroreflective substrate for reflecting incident light beams, and patterned indicia for selectively reducing retroreflectivity of the retroreflective substrate. A portable (handheld) or fixed laser beam base station connected to a computer can read the tag and associate the read tag with information, including data or commands for computer control.

In preferred embodiments, the patterned indicia of the tag are formed by selectively destroying portions of the retroreflective substrate. Alternatively, the patterned indicia are formed by selectively obscuring portions of the retroreflective substrate through surface printing, coating, or other suitable techniques. In multilayer embodiments, a printable and substantially transparent masking layer covering the retroreflective substrate can be used for printing. In still other embodiments that add some active elements to the passive tag, an electrically modifiable region (e.g. LCD, electrochromic material, or other conventional low power, electrically opaqueable material) can be used to selectively obscure portions of the retroreflective substrate. Typically, the opaqued or obscured regions are patterned as a series of stripe emulating conventional bar codes, although other coding patterns can of course be used.

Still another preferred embodiment of the present invention using the foregoing passive, active, or combination active/passive tags provides for a virtual control system using non-imaging scanners (e.g. laser scanning systems) by tracking relationships between light reflective or emissive tags. Advantageously, such a non-imaging system can identify virtual controls based on interrelationships between light reflective or to emissive tag positions. Typically, a user operated virtual control system involves scanning laser beams throughout a room using a laser base station and detecting data signals produced by multiple tags reactive to incident laser beams scanned throughout a room. By tracking positional changes of multiple tags, the positional semantics of the tag can be recognized and allow provision of a control signal in response to user defined location changes in at least one of the multiple tags. Positional changes in tag position can be relatively determined (e.g. with one laser base station) or absolute three dimensional position changes can be determined (e.g. with two or more laser base station, or other position detecting mechanisms such an antenna grid array responsive to radio signals. In a most preferred embodiment, passive retroreflectors are employed.

In certain embodiments of the present invention, electromagnetic induction activated electronic tags can be used for tag activation or location. Such radiofrequency tags are externally triggered by a directed electromagnetic pulse (e.g. from a microradar or narrow beam microwave source) or optical pulse (laser or infrared), and spatial tracking can involve separate electromagnetic tracking systems or laser scanning systems such as previously discussed.

One preferred embodiment of an electromagnetic tracking system suitable for use in conjunction with electronic tags has an embeddable antenna array for activation and localization of electronic tags. These tags can optionally be externally triggered by a directed electromagnetic pulse delivered through the antenna grid array, or triggered by an external light or electromagnetic source, with spatial location being determined with the aid of the antenna grid array.

Additional functions, objects, advantages, and features of the present invention will become apparent from consideration of the following description and drawings of preferred embodiments.

DETAILED DESCRIPTION OF THE DRAWINGS

Figure 1:
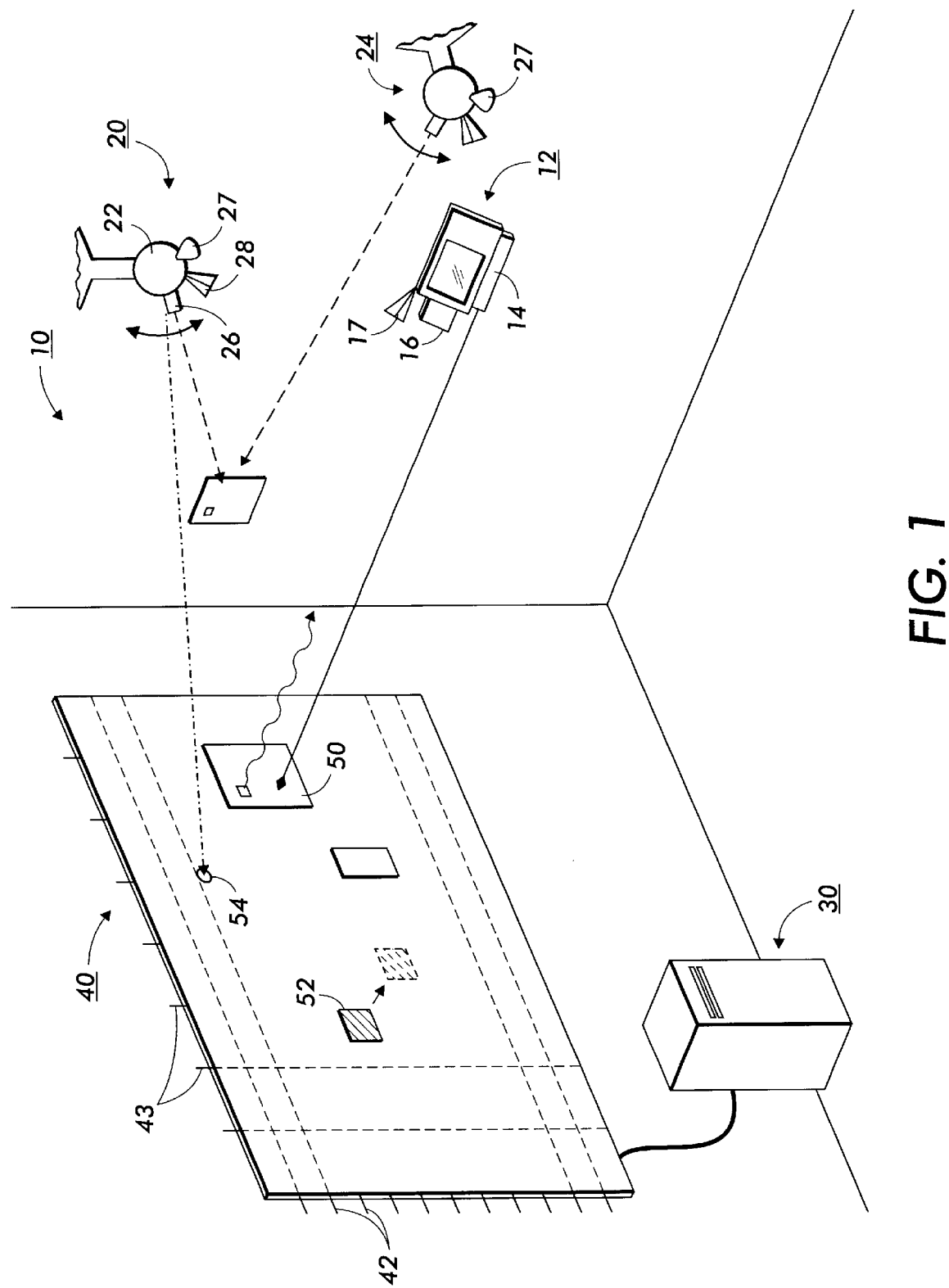
FIG. 1 schematically illustrates a tag tracking system supporting non-imaging laser tracking, as well as electromagnetic tracking and triggering using embedded antenna arrays, with specific triggering of electronic tags using a user (not shown) operable portable computer.

As seen in FIG. 1, a system 10 for identification and tracking of tags distributed in a room can include various mechanisms for spatial localization of normally passive, normally active, or triggerable tags. Because of low cost, use of infrared or radiofrequency electronic tags having a semiconductor memory for data storage, processing logic, and a small IR diode/antenna for broadcasting data, all embedded in rugged epoxy, thermoplastic, or other suitable plastic containers, is preferred. Data storage capacity for such electronic tags typically ranges from a few bits to many kilobits, with 64 bits being typical. Tags can include read only memory (ROM), electrically programmable or erasable (EPROM and EEPROM), or flash memory. An electronic tag can be powered by a long lasting small battery, photovoltaic power, thermal converter, inductive power converter that relies on externally applied electromagnetic energy, or any other suitable power supply. In certain embodiments, tags can even provide user feedback to confirm activation of the electronic tag. User feedback can be visual (e.g. blinking or turning on an LED status light, text based or iconic display presentations), auditory (e.g. an audible buzz or beep), tactile (e.g. a button being raised or a perceptible structure rotation), or combinations of the foregoing.

Tags can be deployed anywhere in a room. Suitable room surfaces capable of retaining objects can include but are not limited to conventional walls, ceilings, floors, pin-boards, writeable chalkboards or porcelain boards, desktops, tabletops, or even hanging tapestries. For example, tags permanently or temporarily positioned on a desktop, a wall adjacent to the desktop, or a file drawer can be detected. In other embodiments, a single wall mounted pin-board capable of holding tagged pin or clip attached objects can be used. This latter embodiment is particularly useful for use in conjunction with a single base station, since angular information alone can be used to spatially discriminate between tags. In certain embodiments particularly suitable for security monitoring, tags can be embedded in objects or otherwise not visually apparent.

In operation, tags can be premarked with suitable graphical, symbolic, or textual indicia. In addition, the tag can be shape or texturally coded for ease of recognition. For example, an electronic tag shaped as a cube or a rectangular solid with identifiable texturing can be color coded or marked with text. Physical objects or artifacts suitable for tagging with passive tags are typically documents, including but not limited to paper based textual documents, small electronic display screens, or textual material. Physical artifacts may also include wall mounted containers having signaling lights, or attachable symbolic icons. As will be appreciated, physical artifacts that can be tagged with suitable tags also include the various documents, notecards, calendars, task schedules, phone number lists, project proposals, informational flyers, meeting announcements, photographs, maps, keys, or magnetic icons commonly used to organize or disseminate information for individuals or groups.

To activate, identify, and spatially locate the foregoing tags, various systems and sensing modes can be employed, alone or in conjunction with each other. For example, FIG. 1 illustrates a scanning unit 20 (base station) that optionally supports comprehensive scanning of a room using laser module 26, microwave module 28 (including radar or other beamed ranging or non-ranging electromagnetics), or acoustic module 27 (including ultrasonic or other beamed ranging or non-ranging acoustic pressure waves). The modules can be gimbal 22 mounted for physical scanning of the room, or other suitable scanning mechanisms can be employed, including use of movable mirrors, diffraction gratings, phase array techniques or any other conventional mechanism for scanning a narrow beam at a known angle (with respect to a suitable coordinate system) through a room. As will be appreciated, multiple widely separated scanning units can be used to provide complete room coverage. Overlap of scanned regions by multiple scanning units further allows three-dimensional positioning when using non-ranging beams. For example, by coordinating angular positioning information from laser beams directed from scanning units 20 and 24 to be incident of a document tagged with a unique laser beam reflective tag, the system 10 can spatially localize the tag in a room. As those skilled in the art will appreciate, for certain applications only angular information from a single scanning unit may be required to spatially separate tagged objects (e.g. when scanning a single wall surface, or when using phase array antenna that permits multiple portions of the array to directing multiple beams at a differing angles, providing limited triangulation for nearby microwave tags). For more general applications, multiple scanning modules integrated to share information or communicate with a common computing systems are preferred.

In certain embodiments, the high precision (centimeter scale localization) possible with permanently fixed scanning units is not required. Simple spatially localized tag activation, or relative positioning, may be all that is need. In such cases, a portable, handheld computer 12 optionally equipped with one or more optical, electromagnetic, or acoustic beam modules can be used. For example, an laser 14, ultrasonic signal generator, or radio detector/directional antenna 17 can be used to project a user scannable beam that triggers, reads, activates, or otherwise interacts with tags having a unique identification. Depending on the beam and type of tag, various detectors 16 (optical, infrared, radio, acoustic) attached to computer 12 can be used to determine tag identity and possibly provide relative or low precision spatial localization.

In still other embodiments of the present invention, spatial localization can be provided without any explicit determination of beam angle. For example, a tag 54 reactive to any incident laser, electromagnetic, or acoustic beams can provide a radio data signal. This radio data signal can be detected by an embedded antenna grid 40 positioned adjacent to the tag in a wallboard, chalkboard, or other suitable material. Using a signal receiver connected to orthogonal lines 42 (X-axis) and lines 43 (Y-axis), the x-y positional coordinates based on maximal signal strength can be used to determine position of the broadcasting tag. Identity of a tag is determined by broadcast of a suitable identifying pulse, amplitude, or frequency modulated data identifier using conventional wireless protocols.

Whatever the spatial detection mechanism or particular protocol used, in operation the system 10 typically has a networked computer 30 (optionally supporting input module 32 for receiving optical, infrared, radio, or acoustic signals, as well as signals received through conventional serial, parallel, USB or other input port) supporting a software based tag tracking system for receiving input from the laser base station and the radio receiver. The tag tracking system stores state records of position and informational content of the tag.

In operation, as seen in FIG. 1, documents 50 or 52, or objects 54 can be tagged to allow for ready manipulation of documents or artifacts through addition, removal, replacement, reordering, or stacking. For example, a team's project schedule might be represented on a wall mounted pin board by pin attached task cards arranged in a timeline format. Such task cards can be easily altered or physically moved with respect to a displayed timeline as people leave a project, schedules slip, or any other problems develop. While tagged objects are often documents, they may alternatively be physical icons, or other small physical artifacts attachable by magnets, pins, adhesives, frictional forces, or other conventional attachment mechanisms. Informational content of at least some of the plurality of tagged components can be directly determined by transfer/reading of information (which may be either an address to an electronic document, or the document information itself) from a tag, or determined by position based associations maintained by a computer based tracking system.

In preferred embodiments, the tracking system provides a database with information necessary for constructing a series of time dependent snapshots of position and informational content. This database is updateable to reflect changes in position and informational content, while still retaining a time/action addressable record of state changes of the plurality of microwave tagged objects. This allows, for example, a user to digitally replay changes in a tagged object collection, or determine the state of tagged objects a day, a week, or a month earlier.

Advantageously, in conjunction with appropriate identification, location, user input, and user output systems, the system 10 can be used to determine identity of text or graphics on documents printed on physical media and removably attached to a surface, associating them with electronic documents accessible through networked computer. Other general applications include sensing the location of tagged documents or other physical artifacts, either in absolute coordinates or relative (e.g. angular differentiation) to a base station or other tagged documents. More advanced tracking systems can be used to perform useful operations based on sensed actions performed by users of the system 10, including, for example, modifications to databases based on location changes of tagged documents.

Figure 2:
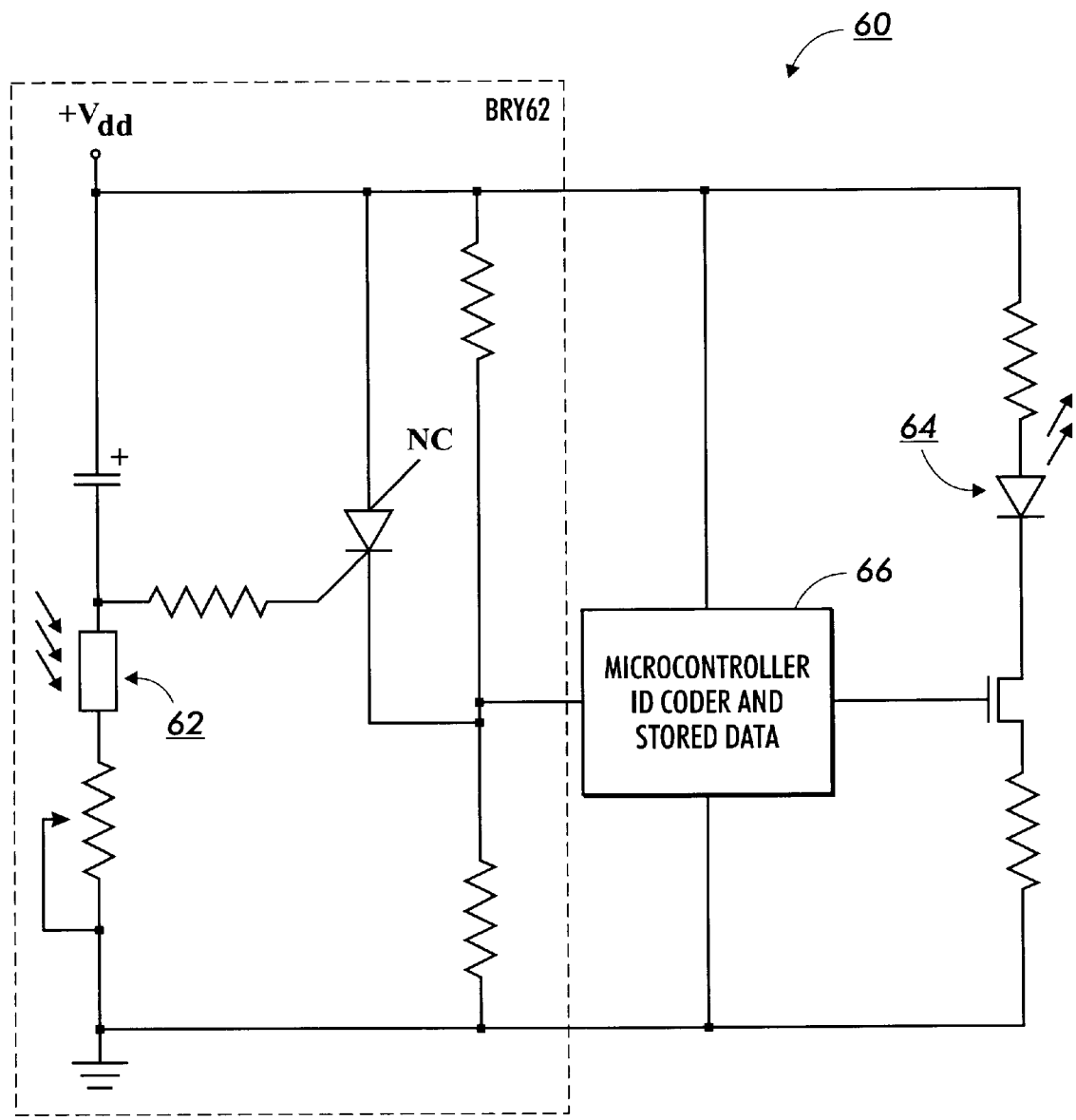
FIG. 2 schematically illustrates an optical trigger circuit for an infrared tag.

FIG. 2 shows one suitable low powered, light based trigger suitable for use in conjunction with a system 10 such as illustrated in FIG. 1. As seen in FIG. 2, a circuit 60 (based on Philips BRY39 or BRY62 surface mount package) supports an IR element 64 for data broadcast. Data is stored in microcontroller 66, and the circuit 60 is triggered to broadcast data by light hitting an LDR 62, which in turn triggers a silicon controlled switch. Data can be broadcast using conventional IrDA standard for receipt and processing by a user's portable computer or other suitable infrared receiver/detection system.

In operation, an intense light source such as a user pointed laser, or an automatically scannable laser such as discussed in connection with FIG. 1, is used to interrogate the circuit 60. Hand holdable red lasers are particularly preferred because of their ability to create a user viewable dot aimable at a specific tag supporting low power trigger circuit 60. Hand holdable lasers are compact, have a long battery life, and are widely available. Conventional hand holdable lasers can easily project a target dot having suitable intensity and size to as much as 50 feet from a user, making them ideal for pointing and triggering devices in accordance with the present invention.

After a user (or automatic computer controlled scanning laser) directs a beam against LDR 60, the resistance of the LDR rapidly drops below a critical threshold to trigger a silicon-controlled switch. Normally, an LDR changes its resistance based on light falling on its surface, with maximal resistance for the LDR being on the order of 10 M Ohms in a dark room and 10 k Ohms in a brightly-lit room. To adjust for room lighting conditions, a resistor or preset is place in series to control resistance values. This allows selective user adjustment of resistance values to artificially create a brighter condition than normal ambient lighting to cause the silicon-controlled switch to switch on. The output of the silicon-controlled switch is used to provide a reset signal to the microcontroller 66. Because the silicon controlled switch and microcontroller typically draw less than 10 microamps in a quiescent state, battery life for the circuit is enhanced, and support for large numbers of such battery-powered devices becomes feasible.

Figure 3:
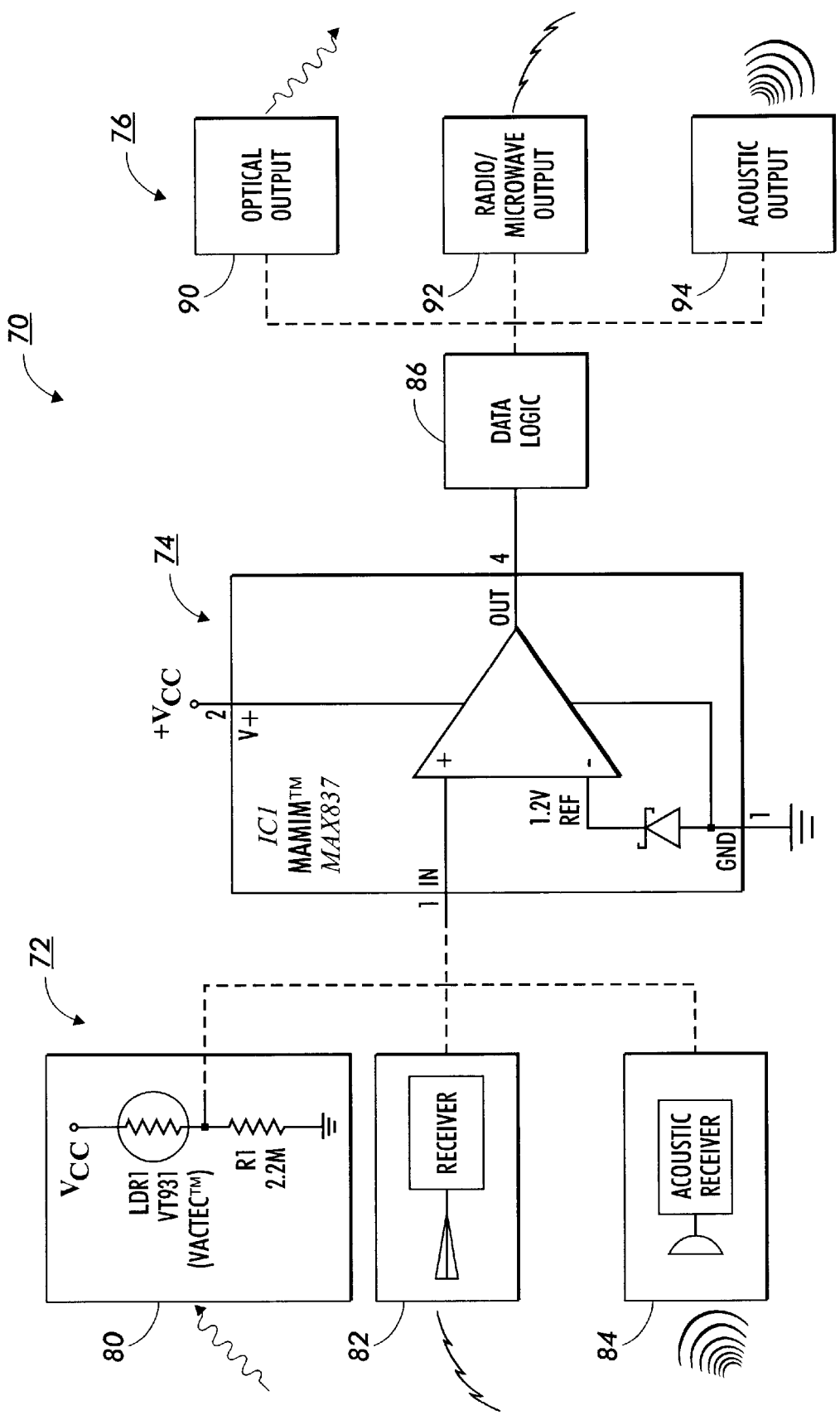
FIG. 3 schematically illustrates various trigger and output circuits suitable for use in conjunction with tags according to the present invention.

Alternative trigger modes and broadcast output modes usable in accordance with the present invention are schematically illustrated in FIG. 3. As seen in FIG. 3 a tag system 70 can optionally be triggered by various trigger mechanisms 72, including optical/infrared input (box 80), radiofrequency, electromagnetic or beamed microwave input (box 82), or acoustic/beamed ultrasonic input (box 84). Broadcast/output mechanisms 76 can similarly include optical/infrared output (box 80), radiofrequency, electromagnetic or microwave output (box 92), or acoustic/ultrasonic input (box 94). Broadcast data is determined by a pulse train from microcontroller/data storage element 86.

To allow for low power operation, trigger circuit 74 is used to wake the microcontroller/data storage element 86 and broadcast/output mechanisms 76 from a normally quiescent, low power state that extends battery life. In preferred embodiments, the trigger circuit 74 uses a Maxim MAX837, MAX931, or equivalent that compares trigger input voltage level (e.g. light level) with a fixed reference voltage that provides a logic switching threshold. Supply voltage can range from 2.5 V to 11 V, with a supply current of several microamps at 11 V.

Figure 4:
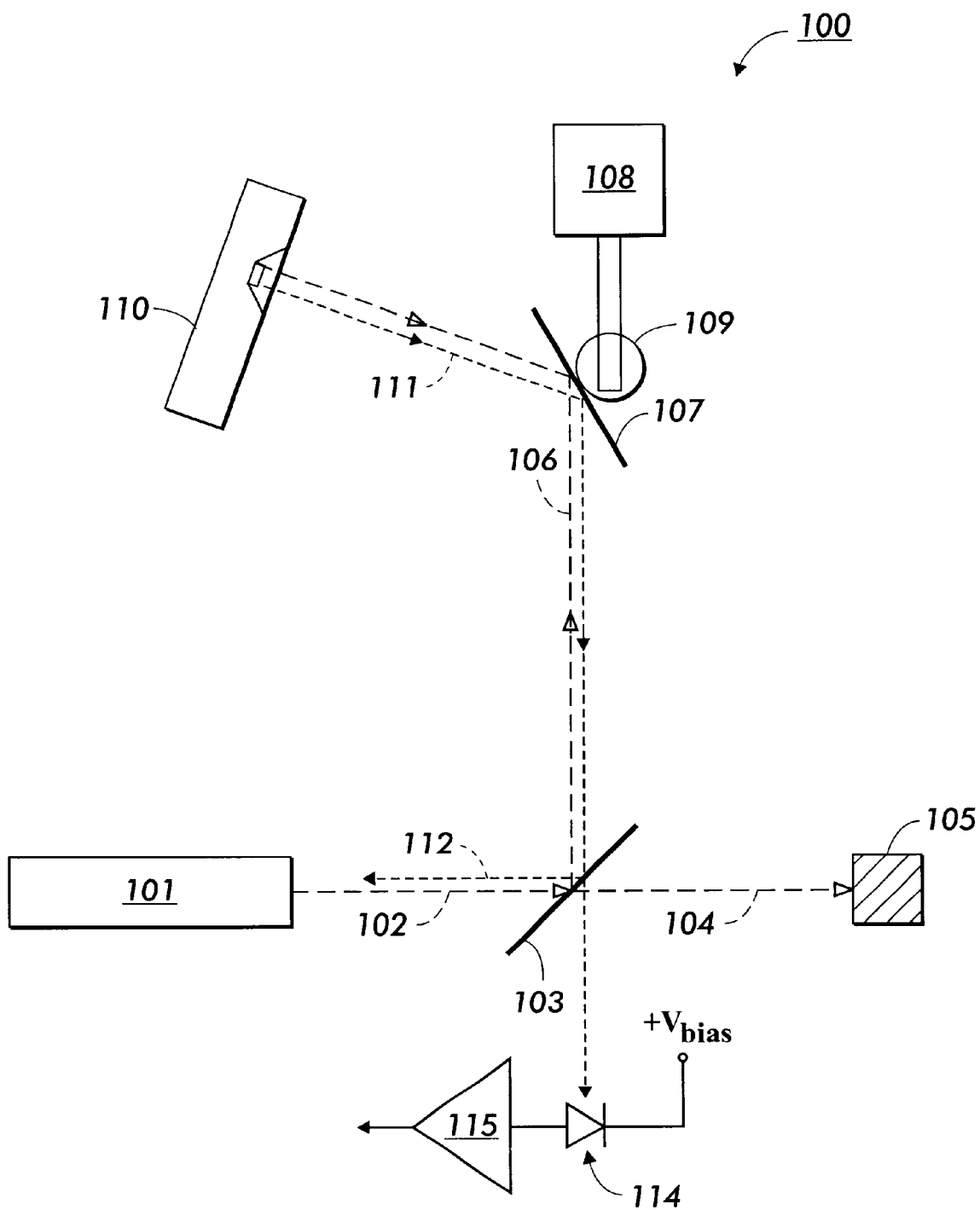
FIG. 4 illustrates an non-imaging laser scanning system.

FIG. 4 schematically illustrates a preferred laser light triggered system 100 for those embodiments of the invention requiring automatic scanning to locate or trigger tags. Particularly suitable for use in conjunction with passive retroreflective tags, the system 100 includes a laser 101 (typically near infrared, but visually perceptible laser wavelengths can be used), and a beam splitter 103. Typically, laser power is on the order of a few mW, and beam splitter 103 signal loss is on the order 3 decibels. In certain embodiments, low loss optical circulators can be substituted for beam splitter 103.

In operation, laser 101 produces an outgoing beam directed along beam path 102 at beam splitter 103. The beam splitter 103 deflects half of the beam to follow beam path 106 and passes the other half along beam path 104 into a light absorber 105. The beam moving along beam path 106 reflects off a movable scanning mirror 107, which is rotated by motor 108 and rotary mechanism 109 to sweep the beam around a room in a two or three dimensional sweep pattern. The reflected beam follows beam path 111 to strike a retroreflective tag 110, and returns along beam path 111 and 106 to beamsplitter 103. A portion of the beam passes through the beam splitter 103 to a PIN diode 114 and amplifier 115, permitting detection of a returned beam. If the beam returned has a recognizable data pattern, further processing can occur to determine position and object tracking and identification.

Figure 5:
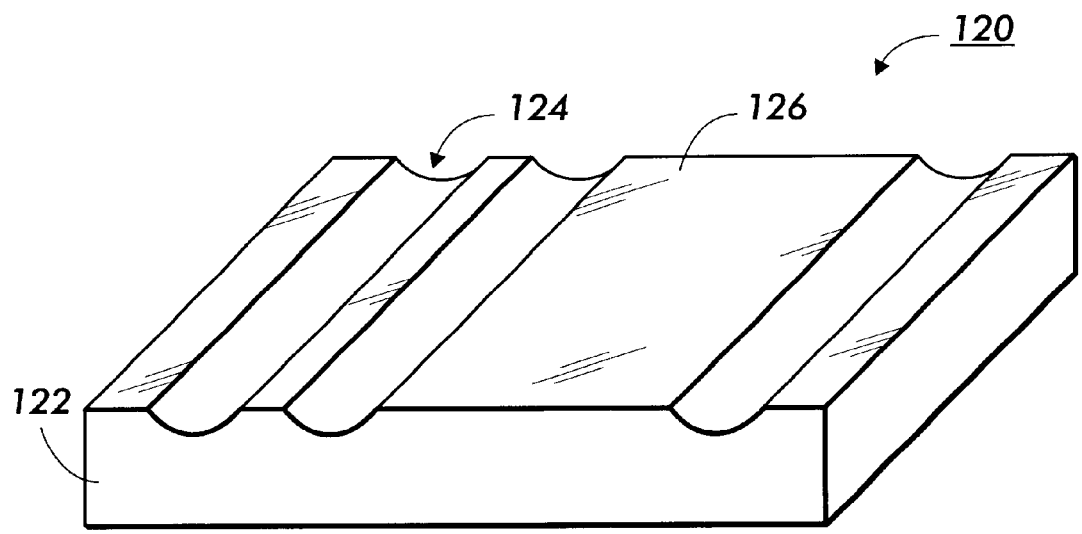
FIG. 5 illustrates a patterned retroreflective tag for use in conjunction with a non-imaging scanning laser system.

One embodiment of the invention particularly suitable for use in conjunction with the system of FIG. 4 is schematically illustrated by FIG. 5. A passive tag 120 is constructed from a high gain retroreflective material 122. Suitable retroreflective tag material includes, but is not limited to, "Reflexite", a trademarked term of 3M Corp. that is formed as a monolayer of half silvered glass spheres carried on a flexible elastomeric substrate. Alternatively, 3M Corporations "Special Effects Projection Screen 7610" can be used. These materials-have a high degree of retroreflectivity, with incident light returned largely along its incident path with very little divergence. For example, the "7610" material has a half power included angle of less than 1 degree, and an on-axis response 1600 times greater than a conventional white diffuser.

As seen in FIG. 5, parallel grooves 124 are inscribed in the retroreflective material 122 of passive tag 120, removing the half silvered glass spheres, corner reflectors, or other suitable high retroreflection material. This results in highly retroreflective lands 126 separated by minimally reflective grooves 124. If the inscribing is done to emulate conventional bar code printing patterns, the grooves 124 correspond to black stripes, while the lands 126 are the separating white spacing stripes. Using a system such as discussed in connection with FIG. 4, the bar code-like data signal can be readily read as a laser beam sweeps across the passive tag 120.

Figure 6:
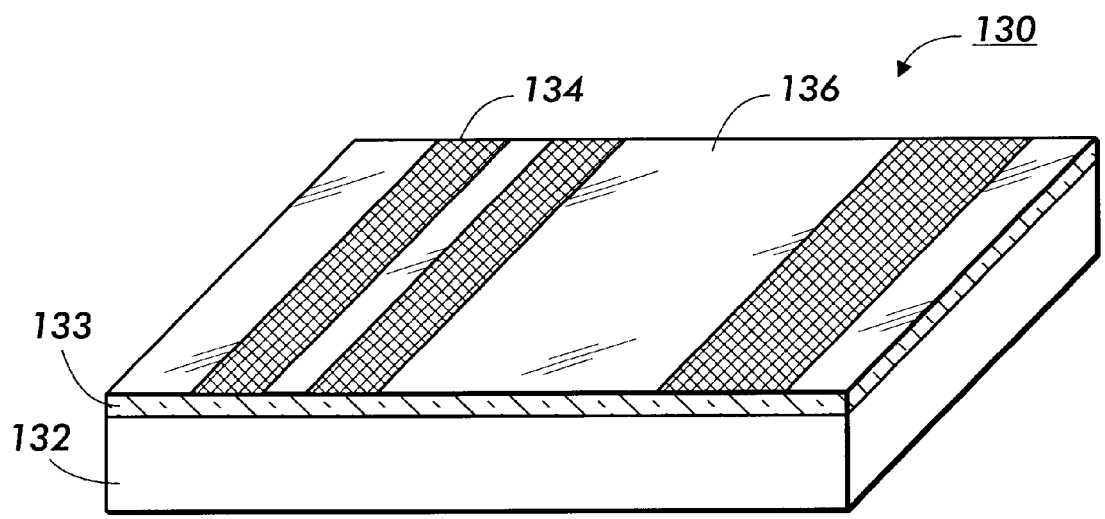
FIG. 6 illustrates a dual layered patterned retroreflective tag for use in conjunction with a non-imaging scanning laser system.

To simplify printing of unique identifying tags, a tag system that supports conventional bar code printing with ink, laser, or other suitable printer can be advantageous. As seen in FIG. 6, a multilayer tag 130 having a transparent printable cover layer 133 and a retroreflective substrate 132 (similar to that described in connection with FIG. 5) can be used. Conventional printing systems can be used to print black stripes 134 across transparent cover layer 133 to emulate conventional bar code printing (or any other suitable identification scheme) by selective obscuration of the retroreflective substrate 132. Again using a system such as discussed in connection with FIG. 4, the bar code-like data signal can be readily read as a laser beam sweeps across the passive tag 120, reading the data signal in the pattern of retroreflected light signal from land area 136 separated by minimal signal from black stripes 134.

Figure 7:
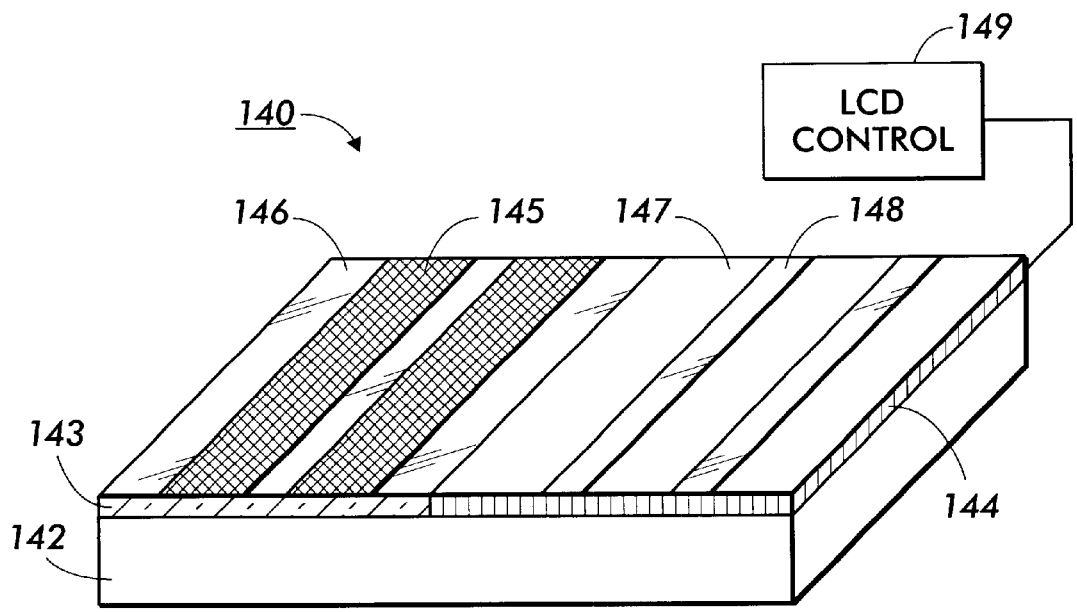
FIG. 7 illustrates a dual layered patterned retroreflective tag with a readily reconfigurable LCD pattern region for use in conjunction with a non-imaging scanning laser system.

A tag system having both passive and active elements is schematically illustrated in FIG. 7. As seen in FIG. 7, a multilayer tag 140 having a transparent printable cover layer 143 and a retroreflective substrate 142 (similar to that described in connection with FIGS. 5 and 6) can be used. Conventional printing systems can be used to print black stripes.145 across transparent cover layer 143 to emulate conventional bar code printing (or any other suitable identification scheme) by selective obscuration of the retroreflective substrate 142. Using a system such as discussed in connection with FIG. 4, the bar code-like data signal can be readily read as a laser beam sweeps across the passive tag 140, reading the data signal in the pattern of retroreflected light signal from land area 146 separated by minimal signal from black stripes 145. In addition, mutable information (e.g. shipping address, quantity of objects in tagged, opened box, etc.) can be read with the aid of an active LCD layer 144. Using an LCD controller 149, dark regions 147 can be formed in active LCD layer 144 to obscure the underlying retroreflective substrate 142 visible through transparent stripes 148. Such a tag advantageously allows use of pre-printed identifying information, while still allowing addition of locale or object specific information in a low cost, low power tag. The LCD controller 149 can be powered by a small battery or photovoltaic power source.

Figure 8:
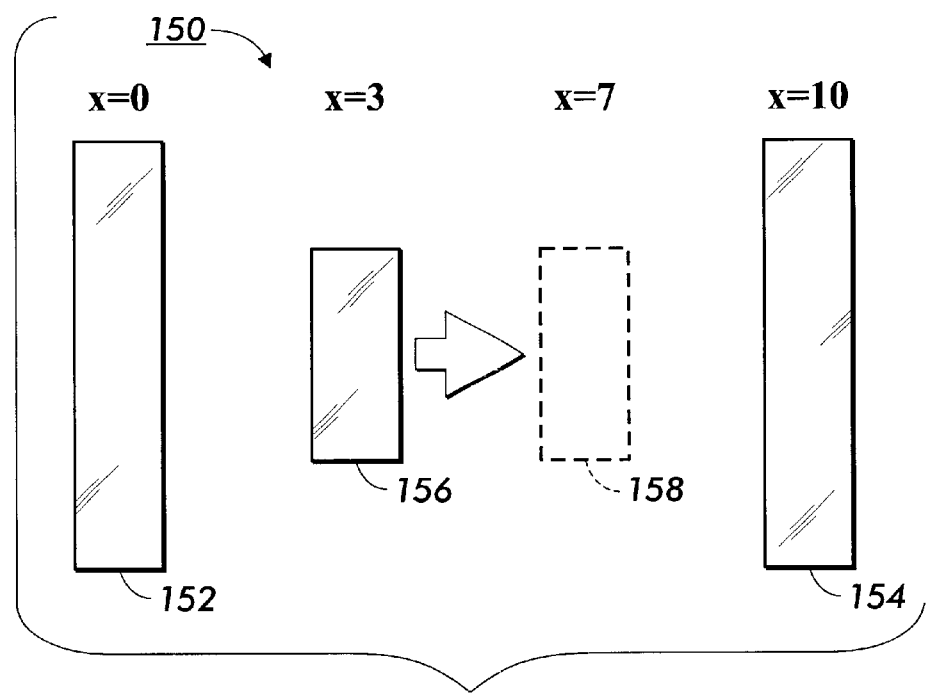
FIG. 8 illustrates a possible virtual control system using retroreflective tag and non-imaging scanning laser system.

In addition to their straightforward use as object identifiers, active or passive tags can be used as part of virtual control systems based on their detected relative or absolute position. For example, as seen in FIG. 8, a virtual slider control system 150 can be constructed from retroreflective tags 152, 154, and 156. Using a tag positioning and identification system such as discussed in connection with FIGS. 1 and 4, the tags 152 and 154 can be associated with a control system (e.g. a temperature controller, light level controller, audio level controller). Movement of a "slider bar 156" from its initial position at X=3 to X=7 (measured in relative distance units between tags 152 and 154), is detected by a non-imaging laser system or other suitable tracking system, and associated with required temperature, light level, audio or other indicated control changes. Similarly, a rotary virtual control system 160 can be constructed to use relative orientation of tags 162 and rotatable "dial 164" as seen in conjunction with FIG. 9.

Figure 9:
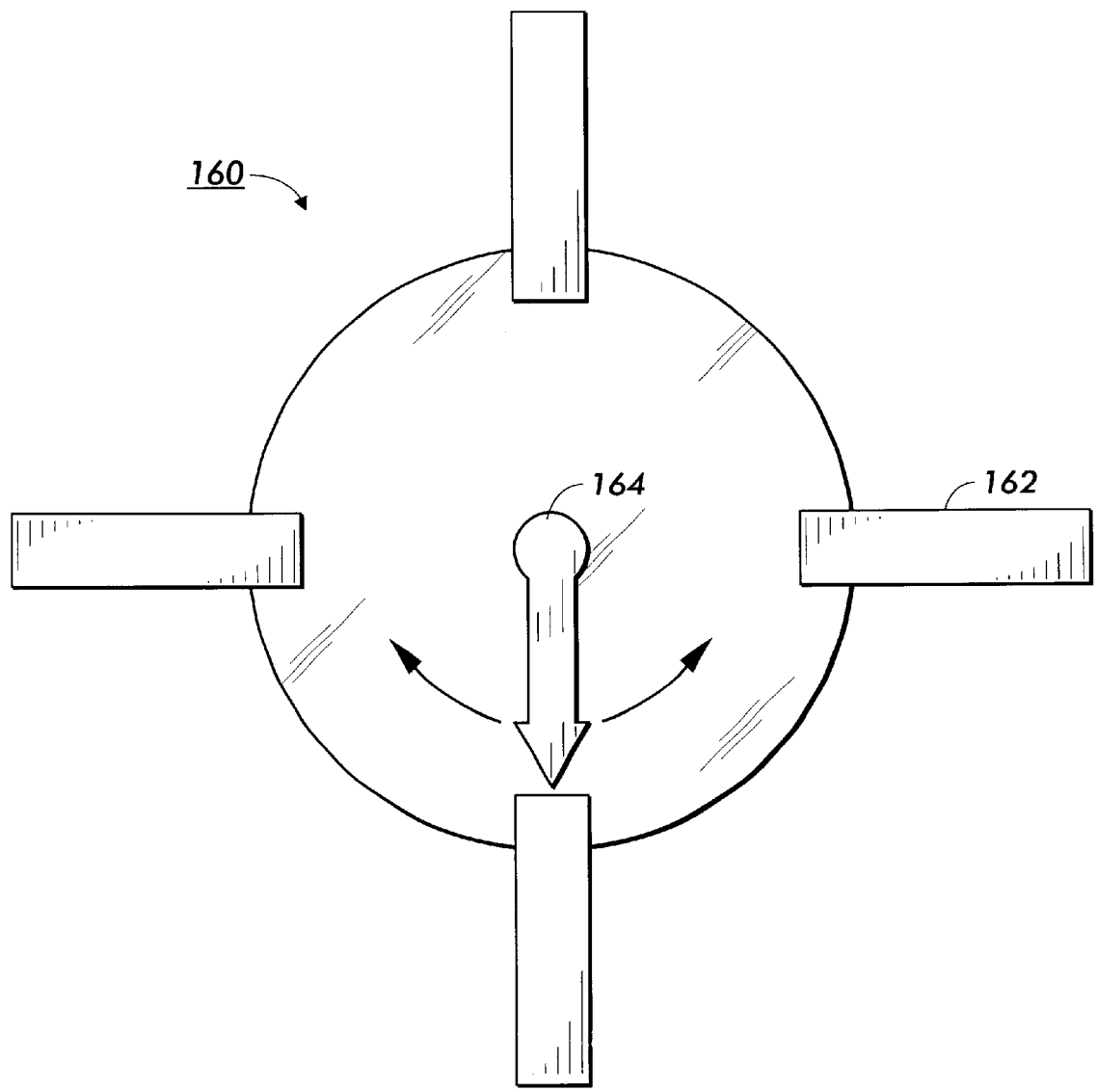
FIG. 9 illustrates another possible virtual control system using retroreflective tag and non-imaging scanning laser system.

Such virtual control systems usable in conjunction with tags as seen in FIGS. 8 and 9 and a tracking and positioning system as discussed in connection with FIG. 1 advantageously do not require direct wire connections, expensive digital or analog electronics, and can be custom designed with appropriate colored or shaped material that is suitably tagged, or is itself a tag. As those skilled in the art will appreciate, each identification number or sensed data value that is read (sensed) from the tag can be labeled as a "command", with a particular digital service or attribute being associated with each command. Although the wide variety of easily distinguishable commands (e.g. identification numbers) would alone provide a powerful virtual user interface to a computer, the present invention further extends the flexibility of the command based user interface by supporting computer control based on a multiple command input, with temporally synchronous (or overlapping asynchronous) tuples of one or more commands (e.g. particular identification numbers and sensed states) being read by the tag reader. Single and multiple commands can in turn be extended by participation in a "sentence". A sentence is defined as a sequence of one or more temporally disjoint commands or command tuples. The sentence level allows definition of an input grammar by appropriate choice of command sequence, and corollary rules governing, for example, use of active verb-like commands (e.g. "go to", "zoom-in", "rotate"), naming noun-like commands (e.g. DOC1.TXT, "yesterday's viewpoint" or other tag associated document, object or command), or connectors (e.g. AND).

To better illustrate operation of the present invention of virtual controls, consider an example scenario wherein surface mountable physical artifacts (i.e. physical icons) are associated with virtual applications, documents or objects, or digital services. In operation, a tagged object such as document has associated textual and electronic data is physically associated by a user with an operator icon shaped as an arrow. The arrow shaped object supports two tags having unique identification signals, allowing the arrow direction to be distinguished by the system. Placing the arrow with respect to the various tags causes modification of that associated electronic data in response to physical association of the operator icon (arrow) with a tagged object (e.g. object with embedded tag). For example, consider a situation where tagged document is positioned near an object symbolically representing a user. An operator icon symbolically configured as a pointing arrow can be positioned to point from the document toward object. This association causes the database and tracking system of the system to electronically mail the document to the user. Reversal of the arrow so that the arrow points from the user symbol to the document can result in modification of document properties, linking the user in the database to the document and automatically informing the user of any updates, changes, or alterations to the document.

As those skilled in the art will appreciate, other various modifications, extensions, and changes to the foregoing disclosed embodiments of the present invention are contemplated to be within the scope and spirit of the invention as defined in the following claim.

What is claimed is:

1. A system for identification and tracking of tags distributed in a room, the system comprising, a laser base station for scanning laser beams, a tag reactive to incident laser beams to provide a radio data signal, a radio receiver for receiving the radio data signal, and a tag tracking system receiving input from the laser base station and the radio receiver, the tag tracking system storing state records of position and informational content of the tag.

2. The system of claim 1, wherein the tag tracking system determines angular position of the tag with respect to the laser base station.

3. The system of claim 1, further comprising at least two laser base stations, and wherein the tag tracking system determines absolute position of the tag based on input from at least two laser base stations.

4. A system for identification and tracking of tags distributed in a room, the system comprising, an electromagnetic pulse generator to produce a local electromagnetic spike, a tag reactive to the local electromagnetic spike to provide a data signal, a data receiver for receiving the data signal, and a tag tracking system receiving input from the electromagnetic pulse generator and the data receiver, the tag tracking system storing state records of position and informational content of the tag.

5. The system of claim 4, wherein the tag tracking system determines angular position of the tag with respect to the electromagnetic pulse generator.

6. The system of claim 4, further comprising at least two electromagnetic pulse generators, and wherein the tag tracking system determines absolute position of the tag based on input from at least electromagnetic pulse generators.

7. The system of claim 4, wherein the electromagnetic pulse generator further comprises a microradar unit.

8. The system of claim 4, wherein the electromagnetic pulse generator further comprises a directable antenna.

* * * * *